(12) United States Patent
Roovers

(10) Patent No.: US 10,994,870 B2
(45) Date of Patent: May 4, 2021

(54) DEVICE COMPRISING A FILLING UNIT FOR FILLING CONTAINERS WITH A PRODUCT

(71) Applicant: MBWJ Beheer B.V., Etten-Leur (NL)

(72) Inventor: Cornelis Antonius Bernardus Roovers, Etten-Leur (NL)

(73) Assignee: MBWJ BEHEER B.V., Etten-Leur (NL)

(*) Notice: Subject to any disclaimer, the term of this patent is extended or adjusted under 35 U.S.C. 154(b) by 30 days.

(21) Appl. No.: 16/476,622

(22) PCT Filed: Dec. 29, 2017

(86) PCT No.: PCT/NL2017/050882
§ 371 (c)(1),
(2) Date: Jul. 9, 2019

(87) PCT Pub. No.: WO2018/131996
PCT Pub. Date: Jul. 19, 2018

(65) Prior Publication Data
US 2019/0364737 A1    Dec. 5, 2019

(30) Foreign Application Priority Data
Jan. 16, 2017 (NL) .................... 2018171

(51) Int. Cl.
*B65B 1/06* (2006.01)
*A01D 45/26* (2006.01)
*A01D 45/28* (2006.01)
*B65B 39/00* (2006.01)
*B65B 39/12* (2006.01)

(52) U.S. Cl.
CPC .............. *B65B 1/06* (2013.01); *A01D 45/263* (2013.01); *A01D 45/28* (2013.01); *B65B 39/002* (2013.01); *B65B 39/007* (2013.01); *B65B 39/12* (2013.01)

(58) Field of Classification Search
CPC .......... B65B 39/002; B65B 1/06; B65B 1/36; B65B 1/24; B65B 39/12; B65B 39/007; A01D 45/28; A01D 45/263
See application file for complete search history.

(56) References Cited

U.S. PATENT DOCUMENTS 2,721,678 A * 10/1955 Gill ........................ F16K 15/035
                                                                         222/445
3,228,412 A *  1/1966 Peterson ................ B65B 39/002
                                                                         137/240

(Continued)

FOREIGN PATENT DOCUMENTS

| NL | 1034384 C2 | 3/2009 |
| WO | 2012/028865 A2 | 3/2012 |
| WO | 2013/088150 A1 | 6/2013 |

OTHER PUBLICATIONS

International Search Report for International Application No. PCT/NL2017/050882 dated Mar. 14, 2018.

*Primary Examiner* — Andrew D St. Clair
(74) *Attorney, Agent, or Firm* — Suiter Swantz pc llo

(57) ABSTRACT

The invention relates to a device comprising a filling unit for filling containers with a product. The invention furthermore relates to a system comprising such a device and to a harvesting machine provided with such a system. Lastly, the invention relates to a method for filling containers with a product by means of a filling unit.

17 Claims, 7 Drawing Sheets

(56) References Cited

U.S. PATENT DOCUMENTS

| | | | | |
|---|---|---|---|---|
| 4,506,492 | A | | 3/1985 | Boyd |
| 4,804,550 | A | * | 2/1989 | Bardsley .................. B65B 1/24 |
| | | | | 141/12 |
| 5,673,539 | A | * | 10/1997 | Jonovic .................. B02C 19/20 |
| | | | | 53/435 |
| 7,624,773 | B2 | * | 12/2009 | Maxwell ................. B65B 5/067 |
| | | | | 141/114 |
| 8,683,920 | B1 | | 4/2014 | Oropeza |
| 2004/0060797 | A1 | | 4/2004 | Oseguera |
| 2010/0132835 | A1 | * | 6/2010 | Oh .......................... F25D 23/12 |
| | | | | 141/311 R |
| 2014/0053949 | A1 | * | 2/2014 | Witt ......................... B65B 1/12 |
| | | | | 141/83 |
| 2017/0197739 | A1 | * | 7/2017 | Ha .......................... B65B 39/12 |

* cited by examiner

DEVICE COMPRISING A FILLING UNIT FOR FILLING CONTAINERS WITH A PRODUCT

BACKGROUND

The invention relates to a device comprising a filling unit for filling containers with a product.

The invention furthermore relates to a system comprising such a device and to a harvesting machine provided with such a system.

Lastly, the invention relates to a method for filling containers with a product by means of a filling unit.

BRIEF SUMMARY

It is an object of the present invention to provide an improved device for filling containers with a product by means of a filling unit. In particular, it is an object to provide a device by means of which containers can be filled efficiently and/or without or essentially without spillage of product.

This is achieved in the device according to the invention by the fact that the filling unit of the device is provided with at least one flap which is displaceable between an open position in which a container situated underneath can be filled with product falling from a filling chamber from the filling unit and a closed position for closing the filling chamber so that the containers can be filled in batches using the filling unit. The device is furthermore provided with a guide unit for guiding the product falling from the filling chamber into the container, in which the guide unit and/or the filling unit is displaceable in the direction of the container situated underneath.

By means of the filling chamber of the filling unit which can be closed with the flap, it is possible to place various containers under the filling unit in succession without product being wasted, for example because the product falls between a filled container and a container to be filled on a conveyor belt which supplies and removes the containers. In this way, it is possible to fill containers without wasting product and to remove them after filling, for example for further processing and/or transportation. Furthermore, moving the filling unit and/or the guide unit prevents product from falling next to the container while being dropped from the filling chamber and/or the product which is situated in the container can be pressed down to prevent the product from falling/being blown out of the filled container due to the container being carried away. In this way, it is possible for containers to be filled with product in an efficient manner and without or essentially without waste using a device according to the present invention.

The product is preferably a compressible product, such as leaf vegetables. The term container is understood to mean a container of any arbitrary shape which is open at the top and which may optionally be closed with a lid after the container has been filled with the contents.

The filling unit and the guide unit may be displaceable with respect to each other. In this way, the filling unit and the guide unit do not have to be moved together in order to fill a container in an efficient manner. Furthermore, it is possible to move the filling unit and the guide unit independently from one another. In this way, it is possible to optimize the process of sequentially filling containers further.

The guide unit forms a chute for the product falling from the filling chamber and the chute is preferably partly funnel-shaped. Due to the fact that the guide unit is designed as a displaceable chute, the product falling between the filling unit and the container can be guided in such a way that it is simple to prevent product from falling next to the container.

The device may be configured in such a way that, before the at least one flap is moved to the open position for filling a container with the product, the guide unit is moved in such a way that the distance between the guide unit and a top edge of the container to be filled is smaller than 25 centimetres, preferably smaller than 15 centimetres. By moving the guide unit towards the container, the distance between the container and the guide unit can be kept as small as possible during filling of the container, so that all or virtually all the falling product ends up in the container. Such a displaceable guide unit ensures that the falling product is not adversely affected, or is only adversely affected to a minor extent, by external influences, such as for example wind, if the containers are filled with product outdoors by means of the device.

It is even possible to move the guide unit against a top edge of a container situated underneath, so that the product cannot escape at all due to the fact that there is no opening or only a very small opening to the outside between the guide unit and the container to be filled. This can be achieved in a simple manner if standard-sized containers are used, so that the guide unit can move between two positions, one of the positions being determined by the standard height of the container.

After the container has been filled, the guide unit is displaceable in a direction turned away from the container, so that a new empty container can be positioned under the device. As soon as the new empty container has been placed under the device, the guide unit will again be moved in the direction of this container in order to limit or even exclude product falling next to the container.

The filling unit is displaceable into the guide unit in order to press down the product in the container. The compressible product, for example leaf vegetables, is compressed in the container as a result of the displacement of the filling unit, thus filling the container in an optimum manner. Furthermore, the top layer of the product, which may at least partly be above the top edge of the container when it is not pressed down, is prevented from blowing or falling from the container as a result of displacement of the container. In a particular configuration of the device, the filling unit may be displaceable from a first position, situated outside the container, to a second position, partly situated in the container, and vice versa. In this manner, the product in the container can be compacted even further. Optionally, the container may then continue to be filled by means of a filling unit which has been moved again. It may also be desired for the compressible product to be situated (considerably) below the top edge of the container, so that the container is removed or manually taken away after compacting.

The filling unit may be provided with at least two flaps. These two flaps form the bottom of a closed filling chamber and, by folding out the flaps, an opening is created between the flaps through which the product can be dropped. In order to push down product in the container, the flaps are closed in order to form a bottom for the filling unit.

It is furthermore an object of the present invention to provide a system for processing containers which are to be filled and/or have been filled with the device in an at least partly automated manner. Such a system comprises the above-described device and at least one weighing unit. This weighing unit makes it possible to measure/record the weight of the product in the container to be filled and/or the pressing force of the filling unit on the product in the container. On the basis of the weighing unit, various processes to be performed by means of the device can be performed in an optimum automated manner. Furthermore, the system may comprise a conveying device, for example at least one conveyor belt, for supplying containers to a position under the device and/or for removing containers. Furthermore, the system may comprise a further conveying device, such as for example a discharge conveyor belt, for removing the containers filled by means of the device. Finally, the system may comprise a supply device for feeding product into the device for filling containers. The supply device may again be a conveyor belt, but it is also possible for the supply device to be a silo or the like. In a particular variant, a mobile harvesting machine comprises the above-described system. Such a harvesting machine can be driven across fields in order to harvest plants, vegetables, herbs and/or fruits directly. By means of the integrated system as described herein, the product can be packed into containers directly for further transportation.

It is an object of the present invention to provide an improved method for filling containers with a product by means of a filling unit. In particular, it is an object to provide a method by means of which containers can be filled in an efficient manner and/or without or virtually without product being wasted.

With the method according to the invention, this is achieved by the fact that a filling unit comprises at least one flap which is moved to an open position for filling a container situated underneath with product, in which the flap is moved to a closed position after a certain amount of product has been dispensed or after a predetermined period of time, in which the falling product is guided underneath the filling unit into the container to be filled by means of a guide unit, in which the guide unit and/or the filling unit is moved in the direction of the container situated underneath and, after a container has been filled, the guide unit and/or the filling unit is moved away from the filled container situated underneath.

It is furthermore possible to move the filling unit into the guide unit after or during filling in order to press down the product in the container. After or during filling, the filling unit can in this case be moved from a first position, situated outside the container, to a second position, partly situated in the container, in order to press down the product in the container.

In order to form an uninterrupted or virtually uninterrupted fall path of the product between the filling unit and the container, the guide unit is moved to the container to be filled before the at least one flap of the filling unit is opened. In this way, it is possible to guide the product into the container without or virtually without waste by means of the guide unit.

BRIEF DESCRIPTION OF THE DRAWINGS

The device, the system, the harvesting machine and the method will now be explained in more detail with reference to the exemplary embodiments shown in the figures.

DETAILED DESCRIPTION

Figure 1:
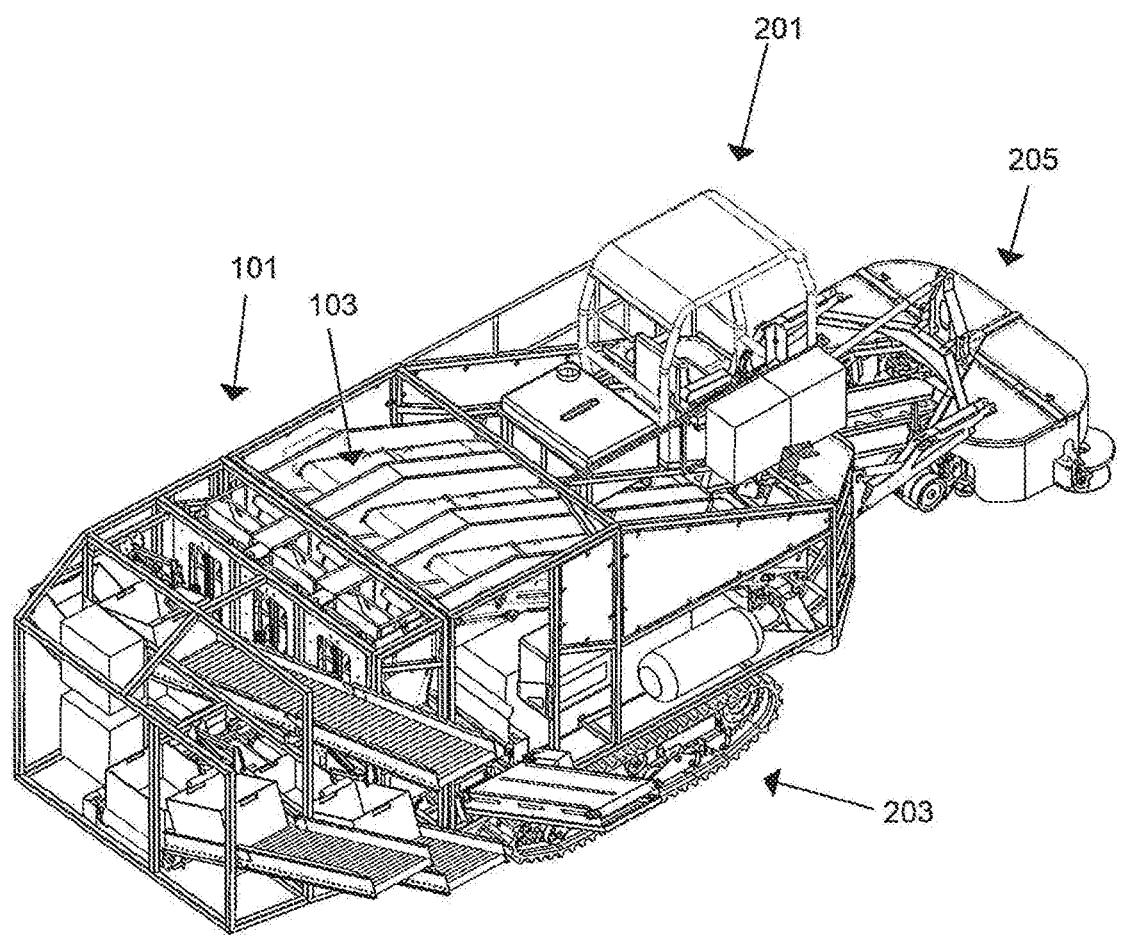
FIG. 1 shows a perspective view of a harvesting machine provided with a system comprising a device for filling containers with a product.

In the figures, identical components are denoted by the same reference numerals.

The harvesting machine 201 which is shown in FIG. 1 comprises a displacement mechanism with caterpillar tracks 203 and a harvesting unit 205 by means of which a product (not shown), such as plants, vegetables, herbs and/or fruits, is harvested. Preferably, the product is a compressible product, such as leaf vegetables, for example spinach or lettuce or herbs.

The harvesting machine 201 comprises conveying means to move the harvested product to a system 101. In the illustrated exemplary embodiment, the product is supplied to the system 101 by means of the conveying means and via a product-supply device in the form of conveyor belts 103. It is possible for the product-supply device to form part of the system 101.

Figure 2:
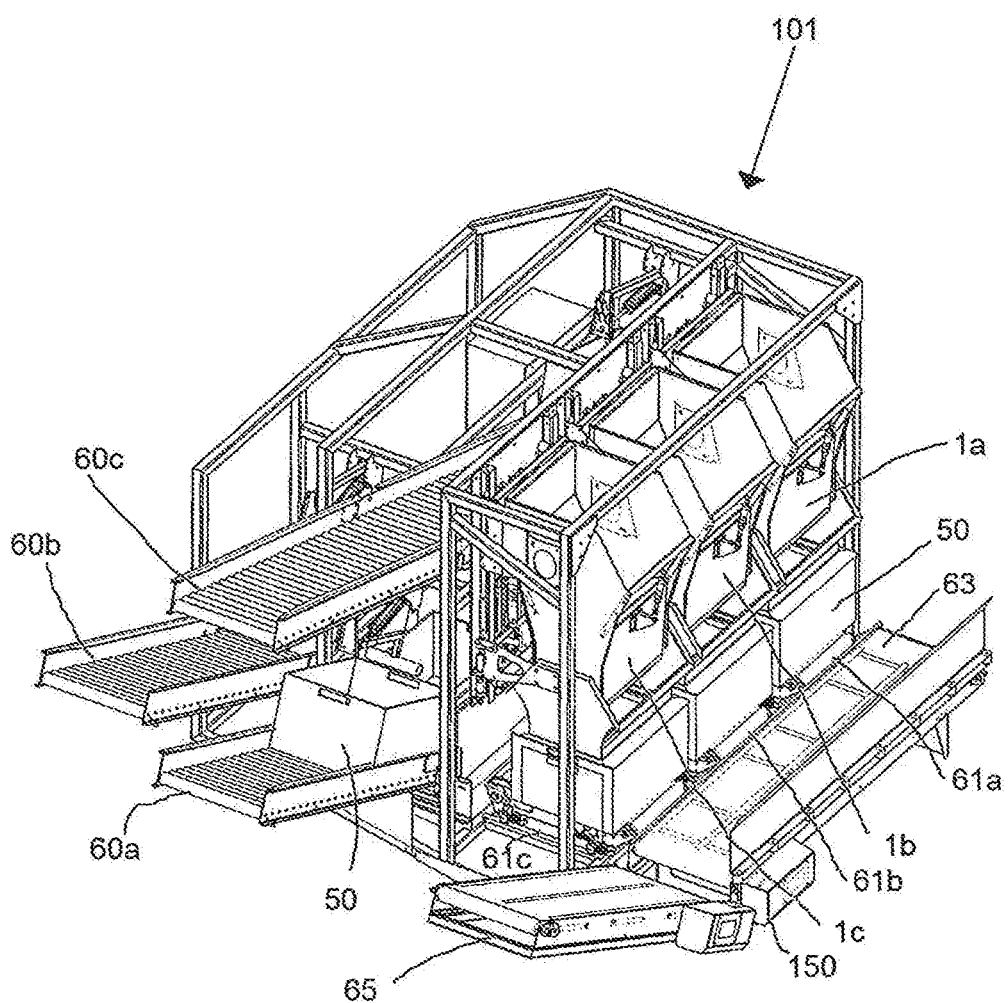
FIG. 2 shows a perspective view of a system comprising a device for filling containers with a product.
Figure 3:
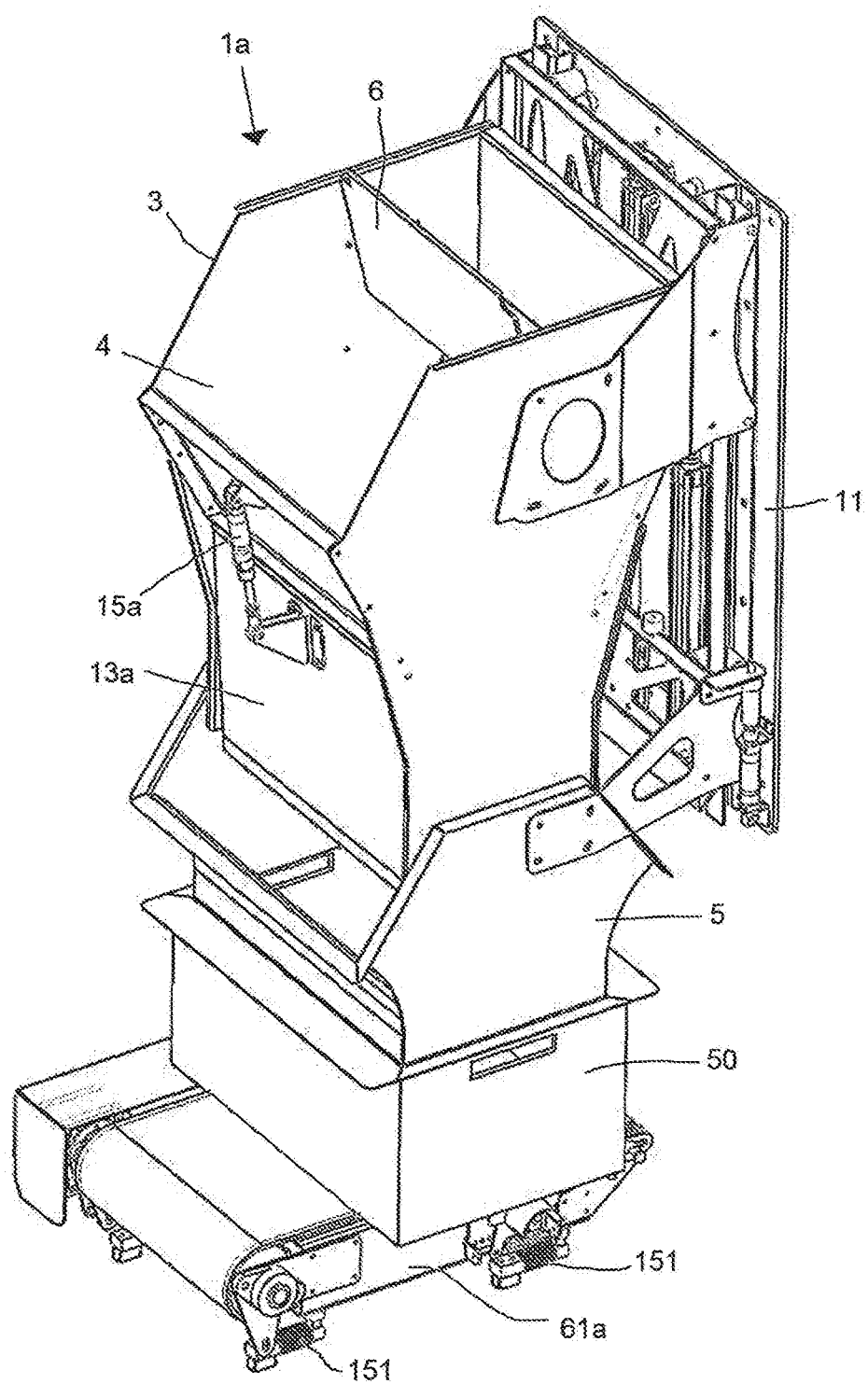
FIG. 3 shows a perspective view of a conveyor belt and a device for filling containers with a product.
Figure 4:
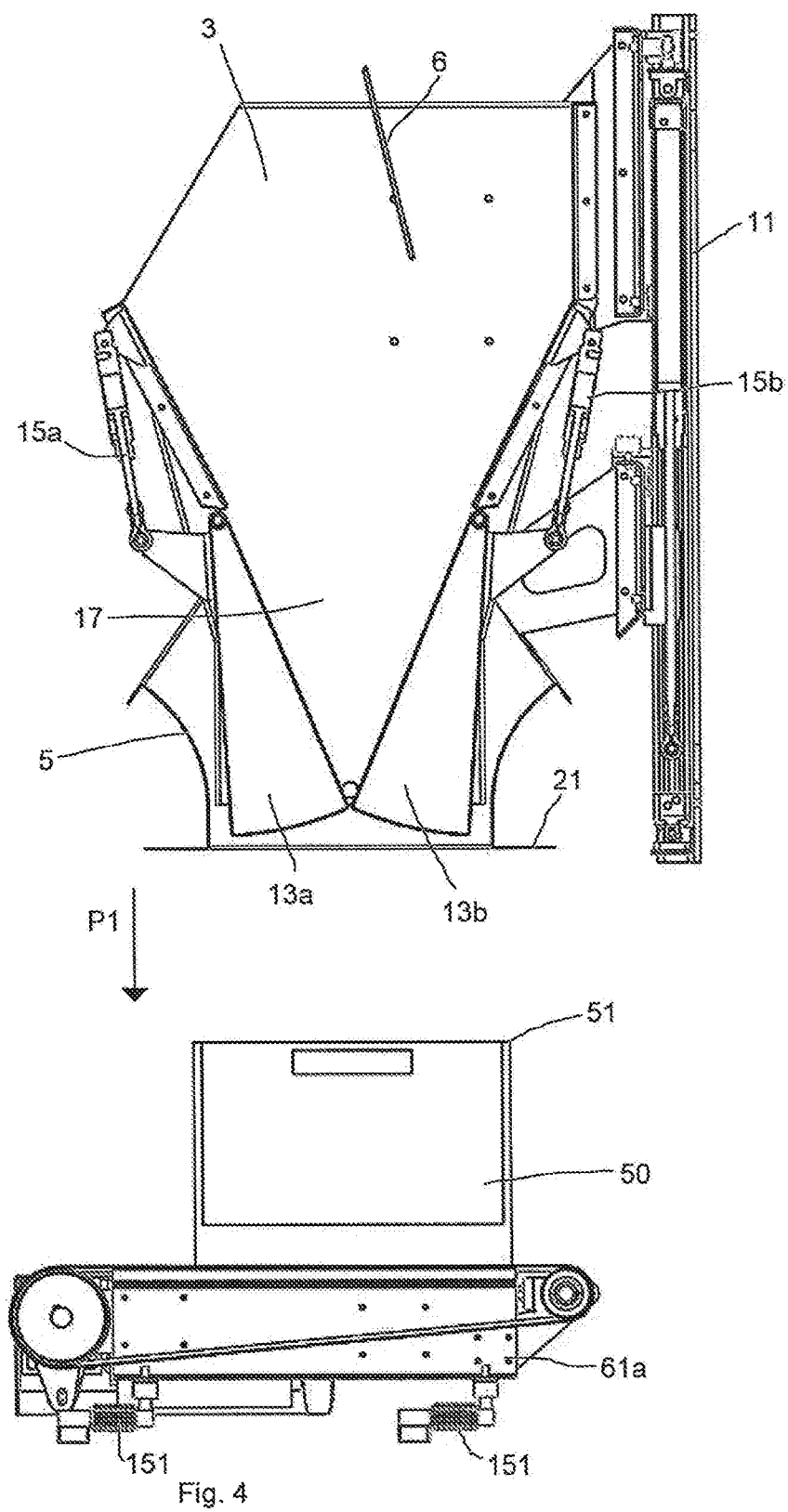
FIG. 4 shows a cross section of the device shown in FIG. 3, in which an empty container is positioned on the conveyor belt.

The system 101 is shown in more detail in FIG. 2. The system 101 comprises a conveying device for supplying and discharging containers 50. The containers 50 have standard dimensions, that is to say the containers 50 are identical in size to each other. The system 101 furthermore comprises three juxtaposed devices 1a, 1b, 1c for filling containers 50 with a product. The conveying device comprises various supply conveyor belts 60a, 60b, 60c for supplying empty containers 50 to each device 1a, 1b, 1c. The conveying device furthermore comprises various discharge conveyor belts 61a, 61b, 61c, 63, 65 for discharging (filled) containers 50 for further processing or for transportation.

The devices 1a, 1b, 1c will be described in more detail with reference to FIGS. 3-7 which show one of the three devices illustrated in FIGS. 1 and 2 (denoted as device 1a). FIGS. 3-7 furthermore show the container 50 on the discharge conveyor belt 61a. The product is supplied into the devices 1a, 1b, 1c via a product supply. In the exemplary embodiment illustrated in FIGS. 1 and 2, the product supply is formed by the conveyor belts 103.

The device 1a comprises a filling unit 3 for filling containers 50 with a product. A displaceable supply flap 6 is situated in a supply opening 4 of the filling unit 3 for controlling the supply of the product into the filling unit 3. The device 1a is furthermore provided with a guide unit 5 and with a frame 11 to which the guide unit 5 and the filling unit 3 are displaceably connected. The guide unit 5 and the filling unit 3 comprise at least one drive mechanism which is attached to the frame 11 or situated in the frame 11 in order to allow the guide unit 5 and the filling unit 3 to be moved independently from one another in a vertical direction.

As shown in FIGS. 3-7, the filling unit 3 comprises two flaps 13a, 13b which are displaceable towards each other or away from each other by means of two actuators, such as the cylinders 15a, 15b illustrated in the figures. The flaps 13a, 13b (FIG. 6) moved away from each other constitute an open position of the flaps 13a, 13b. The flaps 13a, 13b (FIGS. 4, 5 and 7) moved towards each other constitute a closed position of the flaps 13a, 13b. In the open position of the flaps 13a, 13b, a container 50 situated underneath is to be filled with product falling from a filling chamber 17 of the filling unit 3. In the closed position of the flaps 13a, 13b, the filling chamber 17 is closed, so that no product can fall into a container 50. The closed position of the flaps 13a, 13b offers the possibility to fill the containers 50 in batches by means of the filling unit 3. After all, in a closed position of the flaps 13a, 13b, it is possible to discharge a filled container 50 by means of the discharge conveyor belt 61a and to supply an empty container 50 by means of the conveying device until it is situated under the device 1a. The product falling through the opening 19 formed by the open position of the flaps 13a, 13b falls through the guide unit 5 for guiding the product falling from the filling chamber into the container 50.

Before the flaps 13a, 13b are moved to the open position in order to fill a container 50 with the product, the guide unit 5 is moved vertically in the direction indicated by arrow P1 (FIG. 4) towards the container 50 situated underneath in such a way that the distance between the guide unit 5 and a top edge 51 of the container 50 to be filled is as small as possible, so that all or virtually all of the falling product ends up in the container 50. As illustrated, the guide unit 5 may even be positioned against the top edge 51 of a container 50 situated underneath, so that the product cannot escape at all since there is no opening to the outside between the guide unit 5 and the container 50 to be filled. The opening 19 formed by the flaps 13a, 13b is surrounded on all sides by the wall(s) of the guide unit 5.

In the open position of the flaps 13a, 13b, the guide unit 5 moved towards the container 50 extends along the entire distance between the container 50 to be filled and the filling unit 3.

Figure 5:
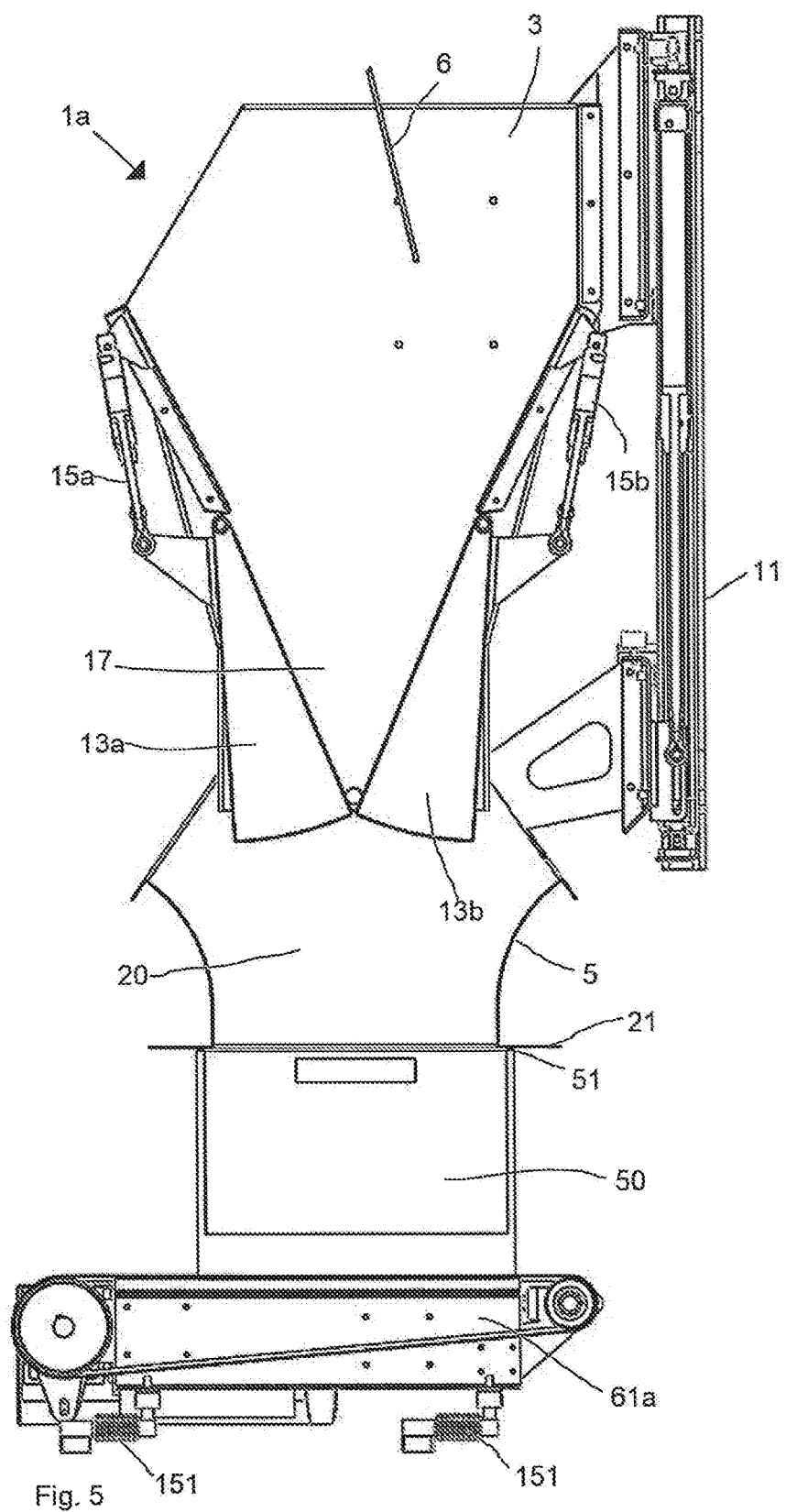
FIG. 5 shows a cross section of the device shown in FIG. 3, in which the guide unit is moved in the direction of the container positioned on the conveyor belt.
Figure 6:
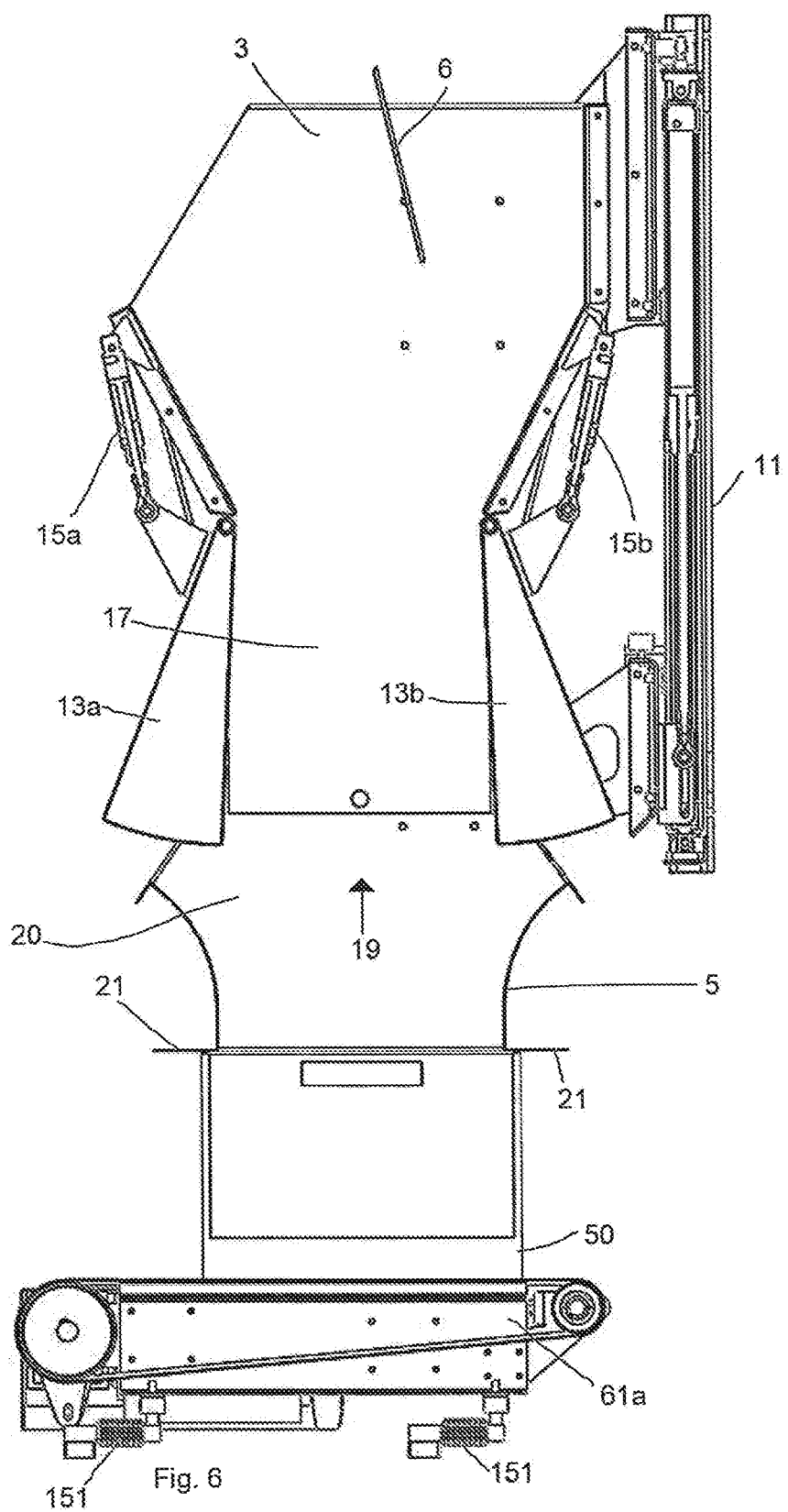
FIG. 6 shows a cross section of the device shown in FIG. 3, in which a filling unit of the device is open.

The guide unit 5 forms a displaceable chute for the product falling from the filling chamber 17, as it were, preferably the wall of the guide unit 5 is partly funnel-shaped, as is illustrated in FIG. 5, in order to provide a streamlined guide for the product falling into the container 50. The guide unit 5 furthermore comprises flanges 21 which are attached to the edge of the outlet. These flanges 21 are positioned on the top edge 51 of the container 50, so that the product can fall from the filling chamber 3 into the container 50 in a closed space. The length and width dimensions of the outlet of the guide unit 5 are smaller than the length and width dimensions of the inlet of the container 50 which is formed by the top edge 51 of the container 50. After the guide unit 5 has been moved in the direction of the container 50 (or in the direction indicated by the arrow P1), for example towards the position as illustrated in FIGS. 5 and 6, the flaps 13a, 13b can be moved away from each other to the open position illustrated in FIG. 6.

After the container 50 has been filled, the filling unit 3 may be moved into the guide unit 5 in order to press down the product in the container 50. In particular, the filling unit 3 may be moved from a first position, situated outside the container (FIGS. 3-6), to a second position, partly situated in the container (FIG. 7), and back again. In this way, the product in the container cannot only be pressed down, but the product may be compacted even further, if desired. Optionally, the container 50 may subsequently be filled further by means of a filling unit 3 which has been moved back. However, it may also be desired for the compressible product to be situated considerably below the top edge 51 of the container 50, so that the container 50 is removed or manually taken away after compacting.

Figure 7:
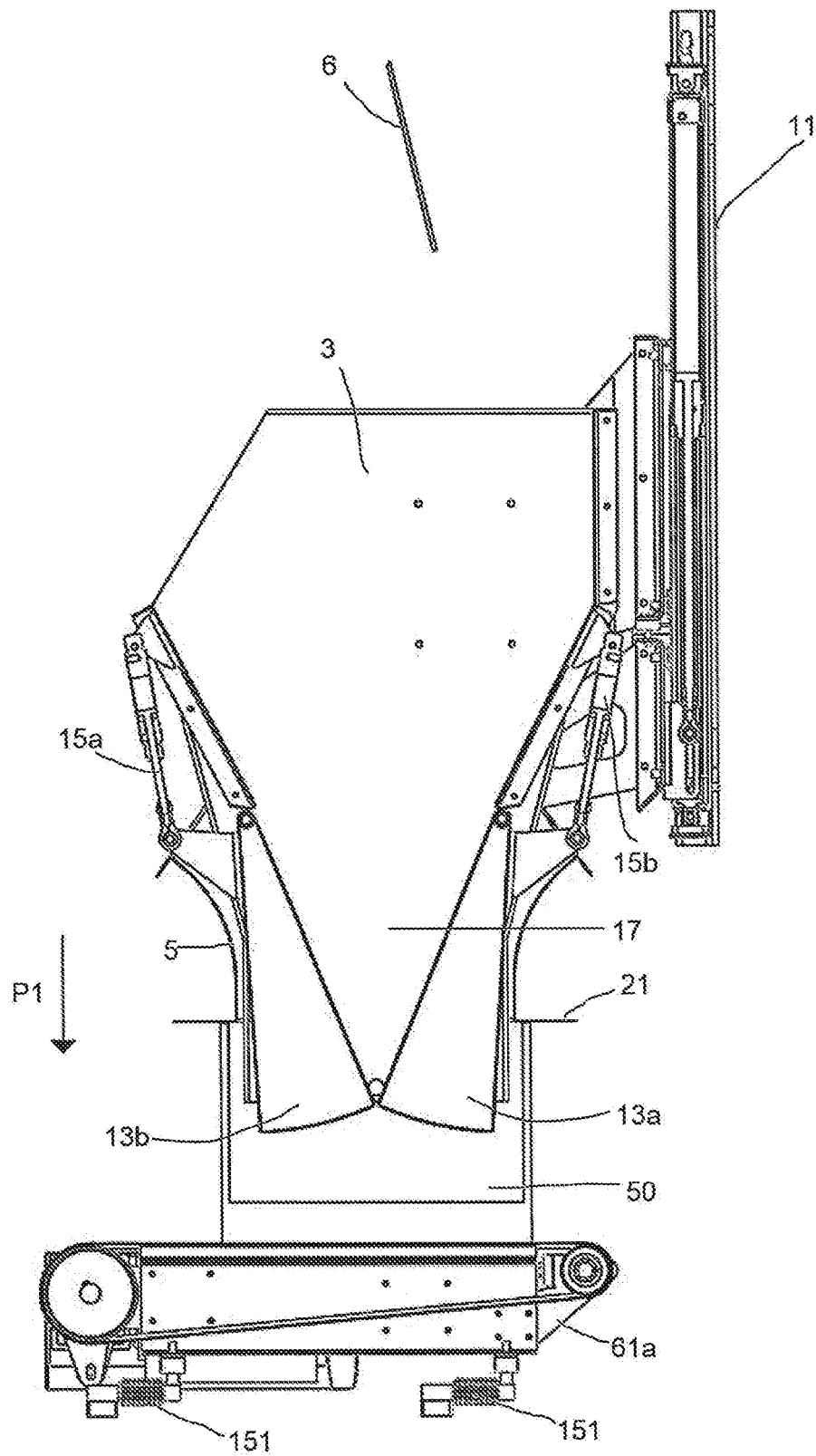
FIG. 7 shows a cross section of the device shown in FIG. 3, in which a filling unit of the device is moved in the direction of the container positioned on the conveyor belt.

Before or during the displacement of the filling unit 3 in the direction indicated by the arrow P1, the flaps 13a, 13b are moved from an open position (FIG. 6) to a closed position (FIG. 7).

The method for filling containers 50 with a product by means of a filling unit 3 will be explained by means of FIGS. 3-7. The flaps 13a, 13b of the filling unit 3 are moved to an open position in order to fill a container 50 (FIG. 6), in which the flaps 13a, 13b are moved to a closed position after a certain amount of product has been dispensed or after a predetermined period of time (FIG. 7). The falling product is guided underneath the filling unit 3 into the container 50 to be filled by means of a guide unit 5, in which, for the position of the guide unit 5 shown in FIG. 6, the guide unit 5 is moved in the direction of the container 50 situated underneath in order to provide a closed falling space 20 between the filling chamber 17 of the filling unit 3 and the container 50 (FIG. 5). When the closed falling space 20 has been provided, the flaps 13a, 13b of the filling unit 3 are opened (FIG. 6), so that the product can fall via the falling space 20 formed by the guide unit 5 and into the container 50. After the container 50 has been filled, the filling unit 3 may be moved in the direction of the container 50 situated underneath (in the direction indicated by arrow P1) in order to press down or compact the product in the container 50. Once a container 50 has been filled and the container 50 has been pressed down or compacted, the guide unit 5 and the filling unit 3 are moved away from the filled container 50 situated underneath by moving it in a direction counter to the direction indicated by arrow P1. At first, the filling unit 3 moves from the position illustrated in FIG. 7, where it is situated in the container 50, to the position illustrated in FIG. 5 and subsequently, the guide unit 5 moves from the position illustrated in FIG. 5, in which the fall path of the product between the filling unit 3 and the container 50 is completely enclosed, to the position illustrated in FIG. 4, in which position the filled container 50 can be taken away and replaced by an empty container 50.

It is possible to configure the filling unit 3 as having only a single flap instead of the two flaps 13a, 13b shown in the figures.

Furthermore, it is possible to provide the system 101 with at least one weighing unit, such as load-weighing cells 151 incorporated in the discharge conveyor belt 61a. These load-weighing cells 151 measure the weight of the product in the container 50 to be filled and/or the pressing force of the filling unit 3 on the product in the container 50. The system 101 is furthermore provided with a processor 150 (FIG. 2) connected to the load-weighing cells 151. The processor 150 is connected, optionally wirelessly, to the drive mechanism for moving the filling unit in the direction indicated by and opposite to the direction indicated by arrow P1 and/or to the actuators (cylinders 15a, 15b) for controlling the opening and closing of the flaps 13a, 13b. By means of the load-weighing cells 151, the processor 150 can determine, by comparing the measurements (the recorded weight) with predetermined or preset values, when the container 50 has been filled with sufficient product and/or when the product situated in the container 50 has been pressed down sufficiently by means of the filling unit 3. If the predetermined value has been reached, the processor 150 transmits a signal to the actuators of the flaps 13a, 13b to close these and/or a signal to the drive mechanism to stop the displacement of the filling unit 3 in the direction indicated by arrow P1 if the product in the container 50 has been pressed down sufficiently. It is also possible to record the position and/or the weight of the empty container 50 via the load-weighing cells 151 and/or via sensors connected to the processor 150, as a result of which the drive mechanism of the guide unit 5 which is connected to the processor 150, if desired wirelessly, can be operated to move the guide unit 5 in the direction indicated by and opposite to the direction indicated by arrow P1 in order to provide a protected falling space 20 for the product or to remove this space 20 after a filling operation.

The invention claimed is:

1. A device for filling containers with product, the device comprising:
    a filler defining a filling chamber for receiving product, the filler comprising at least one discharge flap positioned in a discharge opening of the filling chamber, the at least one discharge flap displaceable between an open condition in which the discharge opening is open such that product can be dispensed from the filling chamber, and a closed condition in which the discharge opening is closed such that product is prevented from being dispensed from the filling chamber;
    a guide chute positioned beneath the filler for guiding product dispensed from the filling chamber into a container positionable beneath the guide chute; and
    a frame to which each of the filler and the guide chute are moveably attached;
    wherein, when the at least one discharge flap is in the closed condition, the filler is displaceable into the guide chute to compact product dispensed into the container by contacting the at least one discharge flap against the product in the container.

2. The device according to claim 1, wherein the filler comprises first and second discharge flaps displaceable apart from each other to provide the open condition of the discharge opening, and are displaceable toward each other to provide the closed condition of the discharge opening.

3. The device according to claim 1, wherein the guide chute is funnel-shaped.

4. The device according to claim 1, wherein each of the filler and the guide chute are independently displaceable relative to the frame and relative to each other in a vertical direction.

5. The device according to claim 1, wherein the guide chute is displaceable relative to the frame such that a distance between the guide chute and the container positionable beneath the guide chute is less than 25 centimetres.

6. The device according to claim 1, wherein the filler is displaceable between a first position in which the filler is positioned outside of the guide chute and a second position in which a portion of the filler is positioned within the guide chute.

7. The device according to claim 6, wherein the at least one discharge flap is displaceable between the open and closed conditions as the filler displaces between the first and second positions of the filler.

8. The device according to claim 1, wherein the guide chute, when the at least one flap is in the open condition, extends between the filler and the container.

9. The device according to claim 1, further comprising a displaceable supply flap positioned in a supply opening of the filling chamber for controlling supply of product into the filling chamber.

10. The device according to claim 1, further comprising a container conveyor belt for conveying containers to a position vertically beneath the guide chute.

11. The device according to claim 10, further comprising a load-weighing cell incorporated into the container conveyor belt.

12. The device according to claim 1, further comprising a product conveyor belt for conveying product into the filler.

13. The device according to claim 12, wherein the product conveyor belt is coupled to a harvesting machine.

14. The device according to claim 1, wherein the device is part of a harvesting machine.

15. A method for filling containers with product, the method comprising:
    providing a device comprising:
        a filler defining a filling chamber for containing the product, the filler comprising at least one discharge flap positioned in a discharge opening of the filling chamber, the at least one discharge flap displaceable between an open condition in which the discharge opening is open such that the product can be dispensed from the filling chamber, and a closed condition in which the discharge opening is closed such that the product is prevented from being dispensed from the filling chamber;
        a guide chute positioned beneath the filler for guiding the product dispensed from the filling chamber into a container positionable beneath the guide chute; and
        a frame to which each of the filler and the guide chute are moveably attached;
    wherein, when the at least one discharge flap is in the closed condition, the filler is displaceable into the guide chute to compact the product dispensed into the container;
    moving the at least one discharge flap to the open condition to fill the container with a predetermined amount of the product;
    moving the at least one discharge flap to the closed condition; and
    displacing the filler into the guide chute to compact the predetermined amount of product in the container by contacting the at least one discharge flap against the product in the container.

16. The method according to claim 15, wherein the device further comprises a container conveyor belt having a load-weighing cell incorporated into the container conveyor belt, and wherein the filler is displaced into the guide chute to compact the predetermined amount of product in the container based on a weight of the predetermined amount of product.

17. The method according to claim 16, wherein the load-weighing cell is operable for determining a pressing force of the filler on the product in the container, and wherein the method is operable for displacing the filler relative to the container depending on the determined pressing force.

* * * * *